Patented Apr. 8, 1941

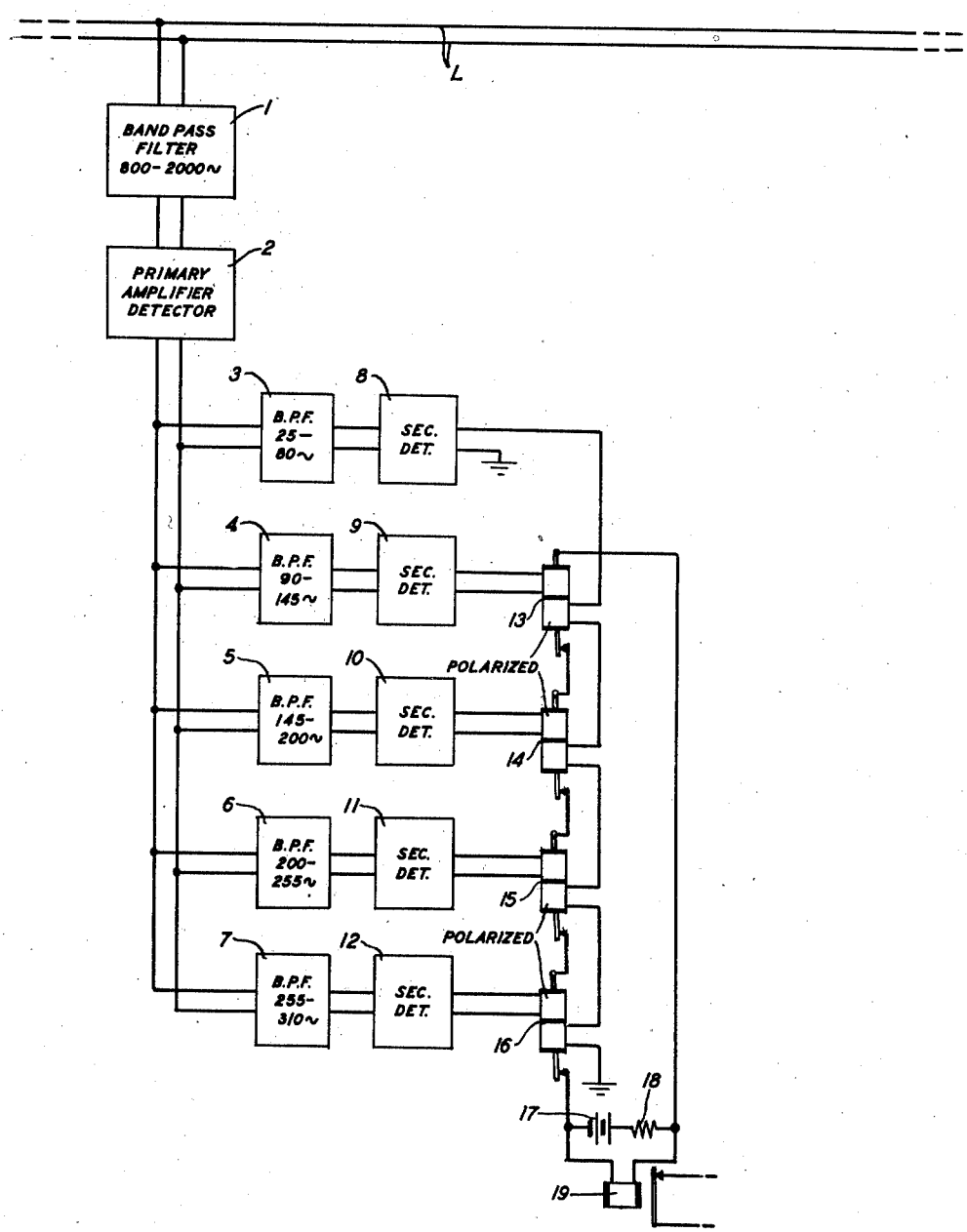

2,237,899

UNITED STATES PATENT OFFICE 2,237,899

SPEECH WAVE DETECTING CIRCUIT

Bjorn G. Bjornson, New York, N. Y., assignor to Bell Telephone Laboratories, Incorporated, New York, N. Y., a corporation of New York Application April 27, 1940, Serial No. 331,973

6 Claims. (Cl. 179—1)

The invention relates to detecting circuits and particularly to speech wave detecting circuits.

An object of the invention is to discriminate between electrical waves having a discrete energy spectrum, such as speech waves, and electrical waves having a relatively continuous energy spectrum, such as static or other noise waves.

A more specific object is to detect instrumentally with a fair degree of accuracy the presence of speech through heavy static interference.

It is known in the prior art to provide discrimination between speech waves and noise waves of relatively continuous spectrum, such as static, by splitting up the combined waves by means of narrow band filters into a sufficient number of equal small subbands so that the amount of power due to the noise in the individual bands is reduced to a negligible value, or is equal in adjacent subbands so that the effects of static may be eliminated by balancing the adjacent subbands against each other, and utilizing the greater amount of power in one or more of the subbands due to the presence of a discrete speech frequency of appreciable power, to produce operation of an indicator or switching device.

Applicant has obtained improved discrimination between speech waves and static in circuits of this general type and with a smaller number of filters by making use of his observation of differences in the energy components in various bands in the output of a detector having a speech wave input, noted by connecting band filters of various band widths across the detector output and making oscillograph records of the energy distribution in the output of the filters.

It was observed that with an input to the detector of a band of speech frequencies in the range 800 to 2000 cycles that the syllabic envelope in the low frequency range from 2 to 20 cycles will tend to produce a maximum in output current. In the range from 90 to 200 cycles, the difference frequencies for male voices corresponding to the fundamental frequency of each voice, are predominant. These frequencies are produced in the detector by modulation of harmonics of the fundamental. In between these two bands, in the frequency range from 25 to 80 cycles, a minimum of output current is produced.

Similar tests were made on the output of the detector with noise input of continuous spectrum within the same audio frequency range. The detector can be considered as a device which produces sum and difference frequencies. Since we are interested in a narrow band at low frequencies, only the difference frequencies have to be considered. It can be shown that for an input band of frequencies spaced closely together the number of difference products plotted against the difference frequency is a straight line. The number of difference products is a maximum at zero difference frequency, and they become zero at a difference frequency equal to the band width, which for an input band of 800 to 2000 cycles would be 1200 cycles. For noise of continuous spectrum, the components in the low frequency band would be greater than the components in the high frequency bands, but with a small separation between the bands the difference in output would be only around 0.5 to 1.5 decibels, depending upon the bands utilized. With the transient nature of static, this difference is negligible. The tests showed that for a static input within the frequency range 800 to 2000 cycles, the amount of static power in the output of the detector was approximately the same for different frequency bands of about 55 cycles width over a frequency range extending from zero to 310 cycles or more.

The various objects and features of the invention will be better understood from the following detailed description thereof when read in conjunction with the accompanying drawing, the single figure of which shows schematically a circuit arrangement of a preferred embodiment of the invention.

In the circuit of the drawing, the circuit L, which may be a telephone line, is assumed to be transmitting electrical waves having a discrete spectrum, such as speech waves, and to be subject to disturbing waves of relatively continuous energy spectrum, such as static. The circuit for detecting the telephonic waves in the presence of the static includes a band-pass filter 1 for selecting from the combined waves a band of audio frequencies, 800 to 2000 cycles; a primary detector or amplifier-detector 2, which may be of the vacuum tube type, for detecting the band selected by filter 1; a plurality of band filters 3 to 7 connected in parallel across the output of the primary amplifier-detector 2 for selecting from the detected waves five subbands of 55 cycles width each, of respective frequency ranges 25 to 80 cycles, 90 to 145 cycles, 145 to 200 cycles, 200 to 255 cycles and 255 to 310 cycles. The subbands passed by filters 3 to 7, inclusive, are respectively detected in different detectors 8 to 12, which will be designated as secondary detectors. The outputs of the secondary detectors 9 to 12 for detecting the four higher frequency subbands are respectively connected to an operating winding on each of four polarized relays 13 to 16. The output of the secondary detector 8 detecting the frequency band 25 to 80 cycles is passed in series through a biasing winding on each of the relays 13 to 16, wound so as to oppose the operating winding.

The relays 13 to 16 are designed so that for a substantially equal current supplied to the two opposing windings the armature of each relay will be held on its contact. With all of the relays 13 to 16 on their contacts, the winding of relay 19 is short-circuited so the relay will not be operated by the battery 17 which in series with the resistance 18 is also connected across the winding.

The static energy output of each of the subband filters 3 to 7, because of the continuous spectrum, should be about the same. Therefore, the static output of secondary detector 8 supplied in series to the biasing windings of relays 13 to 16, respectively, should balance out the equal static output of each of secondary detectors 9 to 12, supplied to the operating windings of these relays, so that there should be no operation of any of these relays by static. However, because the speech energy output of a detector with speech input is a minimum in the frequency range 25 to 80 cycles, and the speech output of a detector supplied with speech input is a maximum for higher frequency subbands of equal width where the pitch frequencies lie, it will be apparent that the output of one or more of the secondary detectors 9 to 12 detecting the subbands passed by filters 4 to 7, will contain a fundamental speech frequency of appreciable power, the energy of which added to the static output of that detector will supply an operating current to the operating winding of the associated relay 13 to 16 which will be sufficient to overcome the biasing current supplied to the biasing winding of the relay from the output of detector 8 due to the static energy only, so that one or more of the relays 13 to 16 will operate.

The operation of any one of the relays 13 to 16 to break the connection of its armature to its contact will remove the short-circuiting connection around battery 17 and the current from that battery supplied through resistance 18 to the winding of relay 19 will cause operation of the latter relay to shift its armature from the right to the left-hand contact indicating the presence of speech current in the inputs of filter 1 from telephone line L.

Many modifications of the circuit arrangement shown in the drawing, which are within the spirit and scope of the invention, will occur to persons skilled in the art. For instance, if the fundamental frequency for each syllable in the speech waves applied to the discriminating circuit varies over a small range, the narrower the band width the greater the discrimination which will be obtained, but the greater the number of band-pass filters required. If cost is of importance, two subband filters each of 110 cycles band width, one for male voices and the other for female voices, may be substituted for the filters 4 to 7 in the system of the drawing, one of these filters passing the frequency range 90 to 200 cycles and the other 200 to 310 cycles, in this case, the sensitivity of the secondary detector 8 following the 25 to 80 cycle filter 3 might have to be increased somewhat because of its narrow band width. The system of the drawing would not be unduly expensive as the band-pass filters used would not require sharp cut-offs, and the secondary detectors may be of the copper oxide rectifier type.

Some of the applications of the speech discriminating circuit of the invention may be in connection with a voice-operated singing suppressor or vodas circuit or an alarm circuit for an automatic control terminal for radio telephone systems. In the former application, because no operation of the control relay 19 of the discriminating circuit takes place on unvoiced consonants, it might be necessary to provide the circuit of the invention with a long operating delay to preserve part of the initial consonants and with a long hang-over to cover the final consonants, so that intelligible speech may be transmitted through a singing suppressor operated from the control relay 19.

What is claimed is:

1. A circuit for discriminating between speech waves having a discrete energy spectrum and noise waves having a relatively continuous energy spectrum, comprising means for detecting a band of audio frequency components of the combined waves, means for selecting from the detected waves one frequency subband in which the speech energy content is ordinarily low and one or more other frequency subbands in which the speech energy content may be substantially larger due to the presence therein of a fundamental speech frequency, means for effectively balancing said one subband against each of said other subbands to neutralize, at least partially, the noise energy components in the selected subbands, and control means responsive to a substantial difference between the energy contents of the balanced subbands to indicate the presence of speech wave components.

2. The circuit of claim 1, in which said one frequency subband selected from the detected waves comprises frequencies ranging from about 25 to about 80 cycles per second and said other selected frequency subbands comprise one or more different frequency subbands of the same band width within a frequency range extending from about 90 to about 310 cycles per second.

3. The circuit of claim 1, in which said one frequency subband selected from the detected waves comprises frequencies ranging from about 25 to about 80 cycles per second, and said other selected subbands comprise two subbands of frequency ranges extending from 90 to 200 cycles per second, and from 210 to 320 cycles per second, respectively.

4. The circuit of claim 1, in which said one subband selected from the detected waves comprises a band extending from about 25 to about 80 cycles per second, and said other selected frequency subbands comprise four subbands of frequency ranges 90 to 145, 145 to 200, 200 to 255 and 255 to 310 cycles per second, and said means for effectively balancing said one subband against each of said other subbands comprises separate secondary detectors for respectively detecting said one subband and each of said four subbands, four relays each having an operating winding and an opposing biasing winding, the operating winding of a different one of said four relays being respectively energized from the output of a different one of said secondary detectors, said opposing windings of all of said relays being energized in series from the output of the secondary detector for detecting said one subband, and said control means is responsive to operation of any one of said relays in response to a substantially greater energizing current supplied to its operating winding than to its biasing winding.

5. A circuit for detecting speech waves in the presence of heavy noise wave interference having a relatively continuous energy spectrum, comprising means to select from the combined speech and noise waves a band of frequencies in the audio frequency range, a primary detector for detecting the selected band, a plurality of filters for respectively selecting from the output of said primary detector a plurality of different frequency subbands of the same band width, including one subband in which the amount of energy due to speech is ordinarily small, and a plurality of higher frequency subbands in which the amount of energy due to speech may be substantially greater due to the presence of a fundamental speech frequency containing a substantial amount of energy, a plurality of secondary detectors for respectively detecting the subbands selected by said one and each of said other filters, means to balance the output of the one of said secondary detectors detecting said one subband against the output of each of the other secondary detectors, to substantially neutralize the noise energy in each of the detected said subbands, indicating means and means responsive to a substantial difference between the output of said one secondary detector and the output of any one of the other secondary detectors, to cause the operation of said indicating means.

6. The circuit of claim 5, in which said filter for selecting said one subband has a transmission range extending from about 25 to 80 cycles per second, and in which said other subband filters transmit different frequency ranges within a range extending from 90 to 310 cycles per second.

BJORN G. BJORNSON.